(12) United States Patent
Dudar (10) Patent No.: US 11,181,056 B1
(45) Date of Patent: Nov. 23, 2021

(54) VEHICLE WITH DUAL PATH EVAPORATIVE EMISSIONS SYSTEM

(71) Applicant: FORD GLOBAL TECHNOLOGIES, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/229,981

(22) Filed: Apr. 14, 2021

(51) Int. Cl.
*F02D 41/00* (2006.01)
*F02M 25/08* (2006.01)
*F02D 13/02* (2006.01)

(52) U.S. Cl.
CPC ....... *F02D 41/004* (2013.01); *F02D 13/0261* (2013.01); *F02D 41/0007* (2013.01); *F02M 25/089* (2013.01); *F02M 25/0836* (2013.01); *F02D 2041/002* (2013.01); *F02D 2200/0602* (2013.01); *F02D 2200/701* (2013.01); *F02D 2250/22* (2013.01)

(58) Field of Classification Search
CPC ............... F02M 25/08; F02M 25/0836; F02M 25/0872; F02M 25/089; F02M 35/10157; F02D 13/0261; F02D 41/0007; F02D 41/003; F02D 41/0032; F02D 41/004; F02D 41/0045; F02D 2041/002; F02D 2200/22; F02D 2041/24; F02D 2041/701
See application file for complete search history.

(56) References Cited

U.S. PATENT DOCUMENTS

| 5,005,550 | A  | * | 4/1991  | Bugin, Jr. | F02M 25/089 |
|           |    |   |         |            | 123/520     |
| 7,900,608 | B2 |   | 3/2011  | Peters et al. |          |
| 10,138,827| B2 |   | 11/2018 | Dudar      |              |
| 2012/0237367 | A1 | * | 9/2012 | Cunningham | F04F 5/20 |
|           |    |   |         |            | 417/55      |
| 2013/0019844 | A1 | * | 1/2013 | Kulkarni   | F02M 25/0836 |
|           |    |   |         |            | 123/520     |
| 2013/0092125 | A1 | * | 4/2013 | Leone      | F02D 9/1055 |
|           |    |   |         |            | 123/319     |
| 2013/0092126 | A1 | * | 4/2013 | Leone      | F02D 9/1055 |
|           |    |   |         |            | 123/399     |
| 2013/0104857 | A1 | * | 5/2013 | Schulz     | F02M 25/089 |
|           |    |   |         |            | 123/520     |

(Continued)

FOREIGN PATENT DOCUMENTS

| DE | 102017006500 A1 * | 1/2019 | ........... F02M 25/089 |
| DE | 102019203557 A1 * | 9/2020 | ........ F02D 41/0007 |
| JP | 2017031878 A * | 2/2017 | |

*Primary Examiner* — John M Zaleskas (74) *Attorney, Agent, or Firm* — Brooks Kushman P.C.; Geoffrey Brumbaugh (57) ABSTRACT

An autonomous vehicle and a method of controlling the vehicle are provided. The vehicle has an accessory powered by an engine with a compressor. An ejector has an inlet positioned to receive compressed air from the air intake system downstream of the compressor, and an outlet positioned to provide compressed air into the air intake system upstream of the compressor. A check valve is positioned between and fluidly connects the canister purge valve and the ejector. A controller is configured to stimulate boosted operation of the engine by activating the accessory and increasing a torque output of the engine to open the second check valve.

18 Claims, 2 Drawing Sheets

(56) References Cited

U.S. PATENT DOCUMENTS

| | | | | |
|---|---|---|---|---|
| 2013/0199504 A1* | 8/2013 | Takeishi | F02M 25/0809 | 123/520 |
| 2013/0296121 A1* | 11/2013 | Gibson | B60K 6/387 | 477/5 |
| 2014/0196694 A1* | 7/2014 | Euliss | F02M 25/08 | 123/520 |
| 2016/0076469 A1* | 3/2016 | Pursifull | F02M 35/10222 | 123/519 |
| 2016/0201615 A1* | 7/2016 | Pursifull | F02D 41/0032 | 123/520 |
| 2016/0273494 A1* | 9/2016 | Hotta | F02D 41/0032 | |
| 2016/0290285 A1* | 10/2016 | Dudar | F01N 5/04 | |
| 2016/0305352 A1* | 10/2016 | Pursifull | F02D 41/004 | |
| 2016/0326990 A1* | 11/2016 | Pursifull | F02M 25/06 | |
| 2016/0341155 A1* | 11/2016 | Dudar | F02D 41/0032 | |
| 2018/0030932 A1* | 2/2018 | Dudar | F02M 25/0836 | |
| 2018/0030937 A1* | 2/2018 | Golladay | F01M 13/04 | |
| 2018/0156162 A1* | 6/2018 | Dudar | F02D 41/0045 | |
| 2018/0163646 A1* | 6/2018 | Tsutsumi | F02M 35/1038 | |
| 2018/0187614 A1* | 7/2018 | Dudar | F02M 25/0827 | |
| 2018/0187633 A1* | 7/2018 | Lee | F02M 25/089 | |
| 2018/0273047 A1* | 9/2018 | Wang | B60W 30/18109 | |
| 2019/0017453 A1* | 1/2019 | Dudar | F02D 41/0037 | |
| 2019/0107081 A1 | 4/2019 | Dudar | | |
| 2019/0234294 A1* | 8/2019 | Sager | F02D 41/0032 | |
| 2019/0384322 A1* | 12/2019 | Luckevich | B60W 10/18 | |
| 2020/0025156 A1* | 1/2020 | Mizushima | F02D 41/0037 | |
| 2020/0141362 A1* | 5/2020 | Eom | F02D 41/004 | |
| 2020/0149486 A1* | 5/2020 | Tachibana | F02M 35/1038 | |
| 2020/0277904 A1* | 9/2020 | Pichler | F02M 25/089 | |
| 2020/0286387 A1* | 9/2020 | Zhou | G08G 1/0175 | |
| 2020/0291902 A1* | 9/2020 | Lee | F02B 37/16 | |
| 2020/0301444 A1* | 9/2020 | Sujan | B60W 30/165 | |
| 2020/0318563 A1* | 10/2020 | Koo | F02D 41/0042 | |
| 2020/0386193 A1 | 12/2020 | Dudar | | |

\* cited by examiner

VEHICLE WITH DUAL PATH EVAPORATIVE EMISSIONS SYSTEM

TECHNICAL FIELD

According to various embodiments, a vehicle is provided with an evaporative emissions system with a dual path purge, and a method of controlling the system.

BACKGROUND

A vehicle with a fuel tank is provided with a fuel vapor recovery system or an evaporative emissions system. The system may be periodically purged or a diagnostic may be run to verify the operational status of the system or components in the system. A valve in the purge lines may need to overcome wet stiction in the valve to provide desired purge or diagnostics of the system.

SUMMARY

According to an embodiment, an autonomous vehicle is provided with an engine having an air intake system, at least one accessory powered by the engine, and a compressor associated with the air intake system. An ejector has an inlet positioned to receive compressed air from the air intake system downstream of the compressor, and an outlet positioned to provide compressed air into the air intake system upstream of the compressor. A canister of an evaporative emissions system is in fluid communication with a fuel tank. A canister purge valve fluidly couples the canister to the air intake system. A first check valve is positioned between and fluidly connecting the canister purge valve and the air intake system downstream of a throttle. A second check valve is positioned between and fluidly connecting the canister purge valve and the ejector. A controller is configured to stimulate boosted operation of the engine by activating the accessory and increasing a torque output of the engine to open the second check valve.

According to another embodiment, a method of controlling an autonomous vehicle is provided. An accessory powered by an engine is activated. Boosted operation of the engine is stimulated by increasing a torque output of the engine such that a compressor in an engine air intake system operates. The compressor draws a vacuum on a check valve positioned between and fluidly coupling a canister purge valve and an ejector. The compressor operation opens the check valve to remove moisture and reduce stiction in the check valve. The ejector receives compressed air from the compressor and provides compressed air into the engine air intake system upstream of the compressor.

According to yet another embodiment, a vehicle system is provided with an engine having an air intake system, at least one accessory powered by the engine, and a compressor associated with the air intake system. An ejector has an inlet positioned to receive compressed air from the air intake system downstream of the compressor, and an outlet positioned to provide compressed air into the air intake system upstream of the compressor. A canister of an evaporative emissions system is in fluid communication with a fuel tank. A canister purge valve fluidly couples the canister to the air intake system via a first passage and a second passage, with the first passage fluidly connecting the canister purge valve to the air intake system downstream of a throttle, and the second passage fluidly connecting the canister purge valve to the ejector. A first check valve is positioned in the first passage. A second check valve is positioned in the second passage, and the second check valve is passive and opens in response to vacuum drawn by the ejector on the second check valve. A controller is configured to receive a drive cycle with a route to a final destination, control the vehicle to drive along the route to the final destination, reduce a torque output of the engine below a vehicle torque demand in response to the vehicle being within a predetermined distance of the final destination, and subsequently activate the accessory and increase the torque output of the engine such that the compressor operates to open the second check valve.

DETAILED DESCRIPTION

As required, detailed embodiments of the present disclosure are provided herein; however, it is to be understood that the disclosed embodiments are merely examples, and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure and invention.

Figure 1:
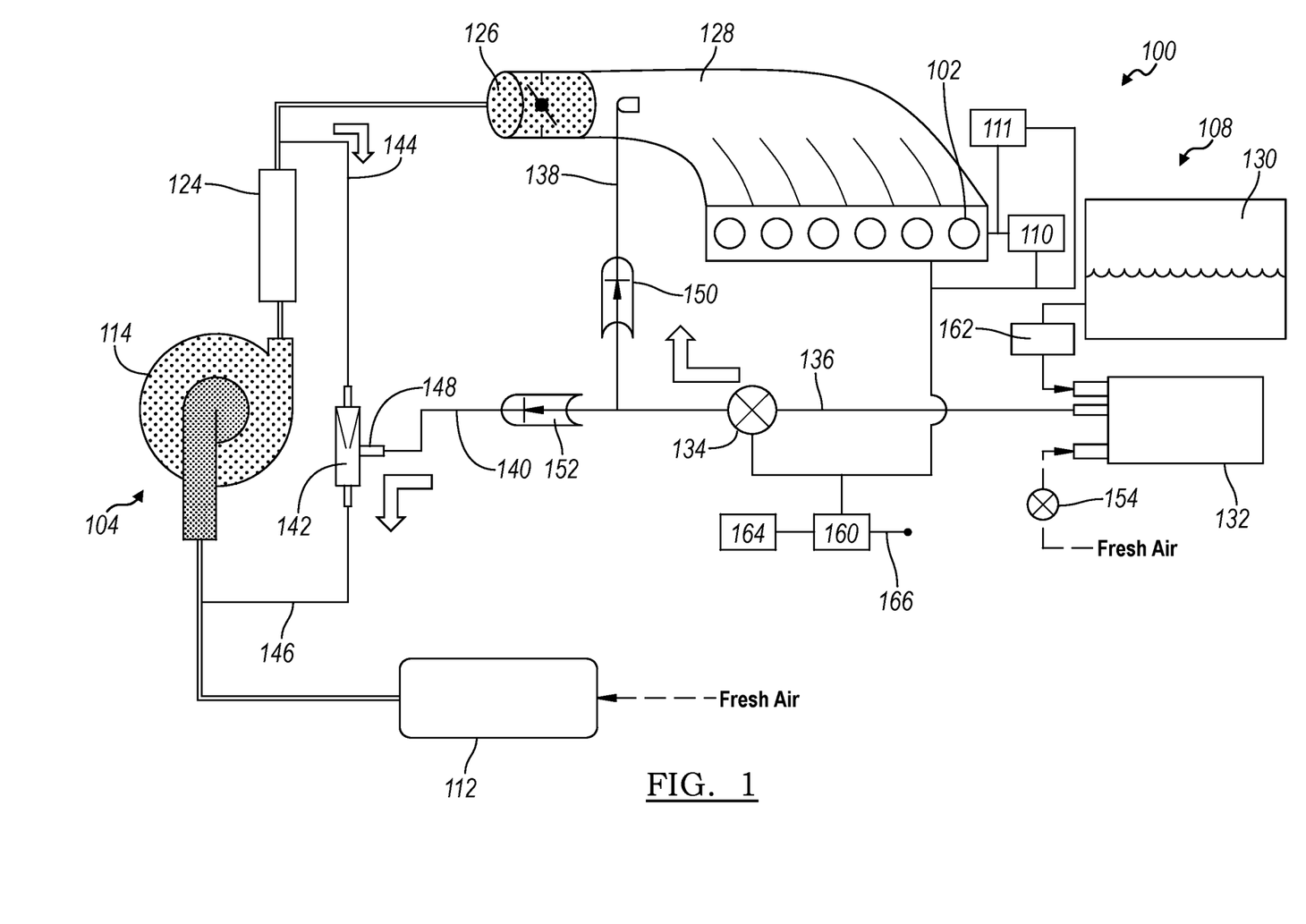
FIG. 1 illustrates a schematic of a vehicle system of an autonomous vehicle according to an embodiment and for use with the present disclosure.

FIG. 1 illustrates an autonomous vehicle 100 or autonomous vehicle system 100 according to an embodiment. The vehicle 100 is propelled via an internal combustion engine, and includes conventional gasoline, diesel, or other fuel powered vehicles, hybrid vehicles, and the like. The autonomous vehicle may or may not contain passengers and be fully autonomous, or alternatively may include vehicles with passengers or a driver that have driver assistance, partial automation, or conditional automation. The autonomous vehicle has a known or partially known drive cycle, and the end point or destination for the drive cycle may be known based on navigation data, driving patterns, history of driving data, pre-selected routes, and the like.

The vehicle 100 has an engine 102 with an intake system 104. The vehicle 100 also has an evaporative emissions system 106 that connects the intake system 104 to the fuel system 108.

The engine 102 is an internal combustion engine, and may be a gasoline or diesel powered engine according to various embodiments. The engine 102 combusts fuel from the fuel system 108 with air from the intake system 104 to output power to a driveline to propel the vehicle, and/or power or drive vehicle accessory systems 111. The vehicle accessory 111 may be mechanically coupled to and driven by the engine. Alternatively, the vehicle accessory 111 may be electrically coupled to and driven by the engine, e.g. with the engine and its engine alternator and the vehicle accessory 111 in electrical communication with one another such as via a common battery. A vehicle accessory 111 places a load on the engine when the accessory 111 is active. Examples of a vehicle accessory 111 include an alternator or a compressor for a vehicle air conditioning system. Alternatively, the vehicle accessory 111 may be an electrical load on the engine via the battery and alternator such as vehicle headlights, a cabin heater, a defroster, or the like. The various vehicle accessories 111 may be activated or turned on incrementally to increase load on the engine until the desired boost amount is achieved. The accessory 111 may alternatively be an electric machine operating as a generator to charge a traction battery, such as for a hybrid vehicle. The engine 102 is connected to an electric motor 110, such as a starter motor, or an electric machine for a hybrid vehicle, that is able to crank or rotate the engine unfueled.

The intake system 104 receives fresh air from the environment via an air filter 112. The intake system 104 may be a forced induction system as shown in FIG. 1, to compress the air prior to the engine. FIG. 1 illustrates a compressor 114 positioned within the air intake system 104. In the example shown, the compressor 114 is a part of a turbocharger, with the compressor 114 mechanically driven by a turbine that is driven by engine exhaust gases. Alternatively, the compressor 114 may be a supercharger that is mechanically driven by the engine, e.g. via the accessory drive. Alternatively, the compressor 114 is a supercharger that is connected to an electric motor and battery, such that it is electrically powered.

A charger air cooler 124 may be positioned in the intake system downstream of the compressor 114. From the charge air cooler 124, intake air flows to a throttle 126 for the engine, and into the intake manifold 128 for the engine.

The fuel system 108 is fluidly connected to injectors for the engine 102 to provide fuel to the engine. The fuel system 108 has a fuel tank 130. The fuel tank 130 is fluidly connected to the evaporative emissions system 106. As used herein, a fluid may include a liquid phase, a vapor phase, or a mixed phase substance.

There may be requirements for emission system components, including the fuel system 108, to be periodically tested onboard the vehicle. To reduce or prevent fuel vapors from entering the atmosphere, the fuel system 108 is provided with the evaporative emissions system 106.

The evaporative emissions system 106 has a canister 132 that is fluidly connected to a vent of the fuel tank 130. The canister 132 is filled with an absorbent material, such as activated carbon, to absorb fuel vapors. As gases containing fuel vapor pass through the absorbent material, the fuel vapor is absorbed. The fuel system 108 may be tested for integrity of the system, or can be diagnosed for leaks of evaporated fuel, by putting all or a portion of the system 108 under a vacuum and observing any change in pressure.

When a fuel tank 130 is filled, fuel vapor laden air may be displaced by the fuel. Also, daily (diurnal) temperature variations lead to lower molecular weight components of the fuel vaporizing during the heat of the day. These fuel vapors are absorbed in the canister 132. The absorbent material, such as activated carbon, has a limited ability to store fuel and, therefore, needs purging to be able to once again absorb fuel vapor displaced from the fuel tank 130. This is accomplished by periodically pulling fresh air through the carbon pellet bed within carbon canister 132 and inducting that air, which contains desorbed fuel, into an operating internal combustion engine 102. The fuel vapors that are desorbed into the incoming air are combusted in engine 102 before being exhausted, and fresh air is drawn into the canister 132. Such operation may be referred to as a purge mode because it partially or completely purges the stored fuel vapors from the canister 132.

The evaporative emissions system 106 has a canister purge valve (CPV) 134 that is positioned between and fluidly connects the canister 132 to the intake system 104. The CPV 134 receives vapor from the canister 132 via a first fluid line 136 or passage, and provides vapor to the intake system 104 via second and third fluid lines or passages 138, 140, in a duel purge configuration.

The evaporative emissions system 106 also has an ejector 142. The ejector 142 is positioned with an inlet 144 to receive air flow from the intake system downstream of the compressor 114, e.g. at a location between the charge air cooler 124 and the throttle 126. The ejector 142 also has an outlet 146 positioned to provide air flow back into the intake system upstream of the compressor 114. The ejector 142 also has a secondary inlet 148 to receive air flow from the CPV 134 and the canister via line 140.

The fluid line 138 fluidly connects the canister purge valve 134 to the intake system, for example, at a location downstream of the throttle 126 or into the intake manifold 128. A first check valve (CV1) 150 is positioned within the fluid line 138 to control flow through the fluid line. The first check valve 150 may be a passive valve with an open position and a closed position. A passive valve as used herein refers to a valve with its position or operational state controlled by the fluid within the fluid line, e.g. the valve is not spring controlled, electrically controlled, or the like. An example of a passive valve is a check valve such as a flap valve, ball valve, or the like. The first check valve 150 may close in response to a boost condition, and may open in response to a vacuum condition or the engine operating without boost pressure.

The fluid line 140 fluidly connects the canister purge valve 134 to the intake system, for example, at a location upstream of the compressor 114 via the ejector 142. The fluid line 140 provides the secondary inlet 148 to the ejector 142. A second check valve (CV2) 152 is positioned within the fluid line 140 to control flow through the fluid line. The second check valve 152 may also be a passive valve with an open position and a closed position. The second check valve 152 may open in response to a boost condition, and may close in response to a vacuum condition or the engine operating without boost pressure.

The evaporative emissions system 106 is able to purge the canister 132 under both vacuum and boost conditions. A vacuum condition exists when the compressor 114 is not providing compressed air or boost pressure to the engine 102, and the engine is rotating fueled or unfueled. A boost condition exists when the compressor 114 is providing compressed air to the engine 102 such that there is boosted operation of the engine.

The canister 132 may also be connected to atmosphere via a canister vent valve 154. In other examples, the evaporative emissions system 106 may be provided without the canister vent valve 154. The canister purge valve 134 and canister vent valves 154 may each be provided as active valves, and may be controlled via a solenoid.

The vehicle 100 may have other components, including valves, temperature or pressure sensors, or the like that are not shown for simplicity.

A controller 160 is connected to the various components of the vehicle system 100. The controller 160 may be provided as one or more controllers or control modules for the various vehicle components and systems. The controller 160 and control system for the vehicle may include any number of controllers, and may be integrated into a single controller, or have various modules. Some or all of the controllers may be connected by a controller area network (CAN) or other system. It is recognized that any controller, circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Vehicles may be required to have diagnostics to validate the integrity of fuel systems 108, such as an evaporative emissions system 106, for potential leaks, and to purge the canister 132 of the evaporative emissions system. Generally, the evaporative emissions system 106 is purged when the engine 102 is operating under vacuum or boost conditions such that the operating engine combusts the fuel vapors. The evaporative emissions system 106 provides for purging vapors from the canister 132 under both vacuum and boost conditions.

According to one example, and when a canister 132 purge is requested by the controller 160 and the compressor 114 is providing compressed air to the engine 102 in a boost condition, the CPV 134 is opened, and the boosted air pressure flows through the ejector 142 and draws a vacuum that is sufficiently high on the second check valve 152 to move the second check valve 152 to the open position. The boosted air pressure in the intake manifold 128 causes the first check valve 150 to move to the closed position.

According to another example, and when a canister 132 purge is requested by the controller 160 and the engine 102 is operating in a naturally aspirated state, the CPV 134 is opened, and the vacuum in the intake manifold 128 is sufficiently high on the first check valve 150 to move the first check valve 150 to the open position, and to close the second check valve 152.

The first or second check valves 150, 152 may each be subject to stiction when moving from a closed position to an open position. Stiction is the static friction that needs to be overcome to enable relative motion of stationary objects in contact. Stiction is a threshold, and not a continuous force, and may be the force or static cohesion provided between mating surfaces of each of the check valves.

If the second check valve 152 is stuck closed, for example, due to stiction, the ejector 142 cannot draw a vacuum on the canister 132 via the second check valve 152 and CPV 134. Therefore, if the CPV 134 is opened during a boost condition, and the fuel tank pressure sensor 162 does not measure a vacuum in the fuel tank 130 or canister 132, then the second check valve 152 may be stuck in a closed position, or the boost pressure may be insufficient to overcome the stiction in the second check valve 152.

The second check valve 152 may be more likely to be stuck in a closed position due to stiction upon restart of the vehicle after an overnight or cold soak of the vehicle, or during humid weather. Water or fuel vapor may condense onto the valve seat of the second check valve 152, which may cause a stiction or suction cup effect, and make the second check valve 152 more difficult to open. The moisture during a cold soak may build up onto valve seat and sealing surfaces of the second check valve 152 and fill in any microscopic imperfections in the sealing surface for a much stronger stiction bond.

A cold soak may be defined as occurring after a vehicle shut down event or vehicle key off, where the vehicle then stays inoperative for sufficient time for the vehicle and vehicle components to reach ambient temperature. A cold soak may generate moisture or condensate from humid air and/or vapor. Upon vehicle start up or key on, and with an engine start to idle, the second check valve 152 is closed based on the engine 102 typically operating in a naturally aspirated state at idle. Once closed, the second check valve 152 may be difficult to reopen based on stiction.

The stiction caused by a wet seal in the second check valve 152 is higher than stiction cause by a dry seal in the second check valve 152, such that it may be much more difficult to break the second check valve 152 open when there is a wet stiction seal. Note that once the second check valve 152 is opened, even after a wet seal, purging the canister 132 under a boost condition may entrain and flush out the moisture in the second check valve 152 such that the second check valve 152 returns to the normal dry stiction operating state and may be easily opened.

If the second check valve 152 is stuck closed, e.g. due to wet stiction, a diagnostic of the evaporative emissions system 106 or fuel system 108 may be unable to run correctly, and a diagnostic flag may be set by the controller 160, requiring a vehicle service event. Alternatively, if the second check valve 152 is stuck closed, e.g. due to wet stiction, the canister 132 may only be able to be purged when the engine 102 is operating in a naturally aspirated state, and not when the engine 102 is operating under a boosted condition, which may unduly limit the time that the canister 132 can be purged.

The present disclosure provides for a method of controlling the vehicle 100 and the vehicle system 100 to prevent wet stiction in the second check valve 152, reduce error in an evaporative emissions system 106 diagnostic, and facilitate purging the canister 132 under a boost condition.

The controller 160 may be in communication with a navigation system 164 for the vehicle. The navigation system 164 may determine or provide a drive cycle to the controller 160. A person may input details of a drive cycle, e.g. destinations or routes. Alternatively, the navigation system 164 may receive drive cycle information from a remote source such as a remote server, another vehicle, or the like, and furthermore may receive the information wirelessly such as over a vehicle to everything (V2X) network. Drive cycle information may also be determined via driving patterns, and historical driving data for the vehicle. A drive cycle may be based on known patterns, information or behaviors, e.g. commuting patterns. Alternatively, drive cycle information may be determined via programmed routes with a final destination, e.g. for use with an autonomous vehicle delivering items with a final destination of a warehouse, store, or parking lot according to one non-limiting example. The drive cycle may include information or driving patterns related to the selected route, such as city driving, highway driving, hills, traffic, weather, and the like. The controller may additionally use or reference vehicle information during the drive cycle, such as towing status, fuel level, and the like. The controller may transmit and/or receive information via antenna 166.

In one example, the drive cycle begins with a vehicle key on, and ends with a vehicle key off. The drive cycle may end at a final destination with a vehicle key off. The drive cycle and included route information provides details on vehicle operation modes along the route, e.g. city driving, highway driving, cold weather, hot weather, high altitude, high grade, mountain driving, rolling hill driving, driving on an expressway on or off ramp, driving after cold soak, and the like. In one example, the set of vehicle operation modes encompasses all temperature and road conditions that a production vehicle may encounter in the real world, and are therefore related to the vehicle driving conditions. The controller controls the engine to output sufficient torque to meet the vehicle torque demand, e.g. road load torque as well as any accessory loads. The vehicle torque demand may be determined by the controller for the drive cycle or segments of the drive cycle based on the route information and vehicle operation modes. When the vehicle is to be operated in a boosted condition may be predicted for the drive cycle by the controller based on the route information and vehicle modes of operation along the route.

Furthermore, the vehicle 100 may be part of a platoon of vehicles in communication with one another. A platoon of vehicles includes a lead vehicle and surrounding, typically following, vehicles. The vehicles in the platoon communicate with one another via V2X such as a vehicle-to-vehicle (V2V) communication system with a Dedicated Short-Range Communications (DSRC), etc. The lead vehicle may provide or transmit various instructions to the following vehicles regarding their operation, e.g., concerning speed, acceleration, braking, steering etc. Furthermore, the vehicles traveling together in the platoon may coordinate diagnostic tests, with the lead vehicle sending instructions to the following vehicles such that the tests are synchronized.

Figure 2:
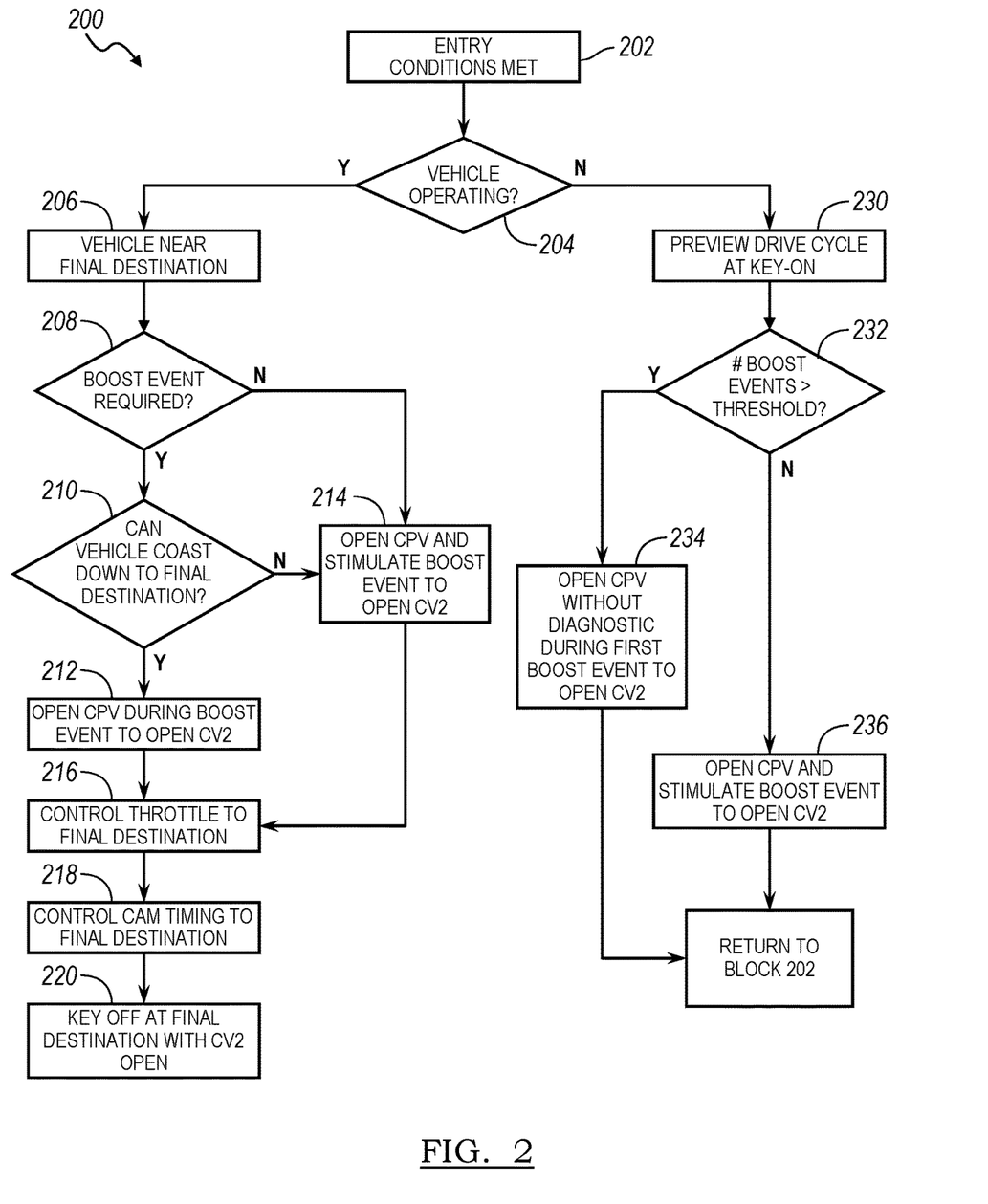
FIG. 2 illustrates a method of controlling a vehicle system according to an embodiment.

FIG. 2 illustrates a method 200 of controlling the vehicle according to an embodiment, and may be used with vehicle 100. The method 200 may have greater or fewer steps than is shown, and steps may be performed sequentially, simultaneously, or in another order in other embodiments.

With reference to FIGS. 1 and 2, and in one example, the method 200 starts at step 202 and determines if entry conditions are met. In one example, an entry condition is an ambient or environmental temperature being above a threshold temperature value, for example, 40 degrees Fahrenheit. In another example, an entry condition is an atmospheric or environmental barometric pressure being below a pressure threshold, such as twenty-two inches of Mercury (inHg) which is equivalent to an altitude of 8000 feet. In yet another example, an entry condition is a fuel level or a projected fuel level, such as fifteen percent. Note that if one or more of the entry conditions are not met, the controller 160 may not perform a diagnostic on the fuel system, as the temperature may be too cold, the altitude may be too high, or the fuel level may be too low.

At step 204, the controller 160 determines if the vehicle 100 is operating, e.g. is in a key-on state. If the vehicle is operating and in a key on state, the method 200 proceeds to step 206. If the vehicle is not operating and not in a key on state, the vehicle is in a key off state, and may further be in a cold soak, and the method remains in standby until a key on event and then proceeds to step 230.

At step 206, the controller 160 determines if the vehicle 100 is near its final destination. In one example, the controller 160 may determine if the vehicle is within a predetermined distance of its final destination as determined from the drive cycle. The predetermined distance may be a coastdown distance, or a distance for the vehicle to reach the final destination in DFSO mode or without fueling the engine. Note that DFSO mode, or deceleration fuel shut off mode, is where the controller 160 commands a shut off of fuel delivery to the engine 102 when the engine is decelerating. In one example, the predetermined distance is on the order of meters, e.g. less than 100 meters.

At step 208, the controller 160 determines if a boost event is required, scheduled, or predicted as a part of the drive cycle prior to the vehicle 100 reaching the final destination and within the predetermined distance from the destination. An example of a required or predicted boost event in the drive cycle would be for a vehicle 100 traveling under high load, e.g. up a steep hill to reach the final destination, for a vehicle towing, etc.

If a boost event is required or predicted as a part of the drive cycle, the method 200 proceeds to step 210, and estimates or determines whether the vehicle 100 is able coastdown to the final destination after the scheduled boost event, or whether additional engine torque, e.g. with the engine operating with partially activated throttle or in a naturally aspirated state, is required to reach the final destination. If the vehicle 100 can coastdown to the final destination after the scheduled boost event, then the method proceeds to step 212.

At step 212, the controller 160 opens the CPV 134 during the scheduled boost event of the engine 102, which opens the second check valve 152.

If there is no scheduled boost event within the predetermined distance, or if the vehicle 100 is unable to coastdown to the final destination after the scheduled boost event, the method proceeds to step 214.

At step 214, the controller 160 may control the engine 102 to reduce the torque output of the engine, and deliberately decelerate or slow the vehicle. The controller 160 therefore commands the engine to output less torque than the vehicle torque demand at the time, which decelerates the vehicle. The engine torque output may be reduced to below that required to meet a vehicle torque demand, or to an output that is less than what is required by the drive cycle and vehicle operating state. Subsequently, the controller 160 may stimulate boosted operation of the engine 102 to open the second check valve 152. The controller 160 may additionally open the CPV 134 when stimulating the boosted operation of the engine to open the second check valve 152. The controller may stimulate boosted operation of the engine 102 by activating the accessory 111 in order to place an additional load on the engine, thereby increasing the torque output by the engine 102 such that a compressor 114 operates and opens the second check valve 152. The engine torque may additionally be commanded to increase to offset the immediately prior reduction in engine torque output, and to meet the vehicle torque demand, including road load torque. Stimulated boosted operation of the engine 102 provides an engine torque output that is greater than the torque required by the vehicle without the accessory 111 being activated and without accounting for the prior reduction in torque output. Note that the accessory 111 is activated for the purposes of stimulating an engine boost condition, and not based on another vehicle or operator request for the accessory 111 to be active. For example, a compressor for an air conditioning system may be activated to stimulate a boost condition without a request for temperature control from the climate control system. Likewise, an alternator may be activated to charge a battery that has a charge above a charging threshold, or provide electrical power to another otherwise inoperative vehicle component that is activated to stimulate a boosted condition.

At step 216, and subsequent to the engine 102 being operated in a boosted condition in steps 212 or 214, the controller 160 is further configured to open the throttle 126 without fueling the engine and during coastdown after the boosted operation is stimulated and until the vehicle reaches the final destination. This acts to reduce vacuum in the air intake system 128 downstream of the throttle 126 and maintain the second check valve 152 in the open position, and prevent the first check valve 150 from opening, when the engine transitions from the boosted condition to a naturally aspirated state. The throttle 126 may be commanded to a fully open position during the coastdown. This may cause additional NVH in the vehicle; however, this is tolerable in AV applications.

At step 218, the controller 160 may additionally control cam timing for the engine 102 such that openings of intake and exhaust valves of the engine are overlapped after the boosted operation is stimulated and until the vehicle 100 reaches the final destination to reduce vacuum in the air intake system 128 downstream of the throttle 126 and maintain the second check valve 152 in the open position, and prevent the first check valve 150 from opening, when the engine transitions from the boosted condition to a naturally aspirated state. For example, with a vehicle 100 with twin independent variable camshaft timing for the intake and exhaust valves, the openings of the exhaust and intake are overlapped to reduce intake manifold vacuum. Alternatively, or additionally, a modified Atkinson cycle may be applied with late closure of the intake valve during the compression stroke. By late closing of the intake valve during the "compression stroke", a portion of the intake air is dumped back into the intake manifold 128 instead of the exhaust manifold, and vacuum in the intake manifold 128 is reduced.

At step 220, the controller 160 is configured to receive a signal indicative of a vehicle key off or shut down event at the final destination, and the vehicle 100 is shut down with the second check valve 152 parked in the open position, and remains in the open position during shut down and a possible cold soak.

If the vehicle is not operating at step 204, the method proceeds to step 230, and upon key on, previews the drive cycle for the vehicle 100. The open or closed state of the second check valve 152 may be indeterminate upon vehicle start up and key on, and the ensuing steps act to cycle or open the second check valve 152 prior to running a diagnostic in order to reduce stiction in the second check valve 152 and avoid a false diagnostic flag being set by a second check valve 152 that is closed due to wet stiction.

At step 230, the controller 160 receives a drive cycle with scheduled or predicted boost events, for example from the navigation system 164. At step 232, the controller 160 compares the number of scheduled or predicted boost events for the drive cycle with a threshold number of boost events. The threshold may be set as a substantial number of boost events, such as five or more, with each of these predicted boost events lasting for three or more seconds.

If the number of scheduled boost events is greater than the threshold, the method 200 proceeds to step 234. At step 234, the method 200 and controller 160 sacrifices use of the first boost event for a diagnostic. Instead of running a diagnostic during the first boost event, the controller 160 conditions the second check valve 152 into the open state and cracks the stiction seal that may have formed, e.g. during a cold soak. As the number of scheduled boost events is high and above the threshold, use of the first boost event to open the second check valve 152 does not unduly impact standards under CARB In Use Monitoring Performance (IUMP) as other opportunities to perform the diagnostic exist in the same drive cycle based on the predicted number of boost events.

At step 234, the controller 160 commands the CPV 134 open during the first boost event of the drive cycle such that the second check valve 152 is opened. If the vehicle is equipped with a canister vent valve 154, it may also be commanded to a closed position to facilitate faster flow of air through canister and second check valve.

Subsequent to step 234, and during the drive cycle, the controller 160 may perform a diagnostic by opening the canister purge valve 134 in response to a subsequent one of the plurality of boost events to reopen the second check valve 152 and evacuate the canister 132 or run the diagnostic. The controller 160 then sets a flag indicating evacuation of the canister or completion of the diagnostic after the subsequent one of the plurality of boost events.

If the number of scheduled boost events is less than the threshold, the method proceeds to step 236. As there are fewer predicted boost events, and therefore fewer opportunities to conduct a diagnostic or purge the canister, the controller 160 may stimulate a boost event or boost condition to open and cycle the second check valve 152.

At step 236, and in response to a number of scheduled boost events in the drive cycle being less than a threshold, the controller 160 stimulates the boosted operation of the engine prior to a first one of the scheduled boost events at step 236, as described above with respect to step 214. The controller 160 may additionally command the canister purge valve 134 to an open position when the boosted operation of the engine is stimulated. If the vehicle is equipped with a canister vent valve 154, it may also be commanded to a closed position to facilitate faster flow of air through canister and second check valve.

In further examples for the method 200 of FIG. 2, and with reference to FIG. 1, the evaporative emissions system 106 may be provided without a canister vent valve 154 and/or without a fuel tank pressure sensor 162. Therefore, a diagnostic may not be readily available to test the second check valve 152 to determine if it is functioning or detect that it is open. If the operational status of the second check valve 152 is unknown, and the second check valve 152 is stuck closed, the controller 160 may initiate a purge of the canister 132 under a boost condition that does not actually purge the canister 132 as there is no fluid flow through the second check valve 152. The present disclosure provides a method 200 to precondition the second check valve 152 to open prior to a diagnostic or purge event, and to reduce stiction in the second check valve 152.

For a vehicle 100 in a platoon, the lead vehicle typically initiates commands to the other, follow vehicles as to how to control braking, steering, etc. such the vehicles in the platoon are coordinated with one another. Vehicles in platoons may operate close to one another or in tight vehicle arrangements, for example, in congested cities and highways. The vehicles in the platoon may additionally synchronize their engine controls.

Prior to steps 212, 214, 216, 218, 234, or 236, and when the vehicle 100 is a lead vehicle in a platoon, the controller 160 may transmit a signal via antenna 166 to another vehicle, such as a follow vehicle, in the platoon of vehicles with instructions to synchronously stimulate a boosted operation of another engine of the another vehicle with the boosted operation of the engine 102. Therefore, towards the end of a drive cycle, if the lead vehicle initiates the method to position the second check valve in an open position as described above, then the rear or follow vehicles are commanded to mimic the lead vehicle engine controls commands in synchronized fashion.

Alternatively, the vehicle 100 may be a follow vehicle in the platoon of vehicles and the controller 160 may receive a signal via antenna 166 from another vehicle, such as a lead vehicle in the platoon. The controller 160 then synchronously stimulates the boosted operation of the engine 102 with the boosted operation of the engine of the lead vehicle in response to receiving the signal to perform one of steps 212, 214, 216, 218, 234, or 236.

Various embodiments of the present disclosure have associated, non-limiting advantages. For example, the present disclosure leverages the ability of an autonomous vehicle (AV) to control its own drive behavior or have a known drive cycle, and as such, the vehicle may be controlled toward the end of the drive cycle to strategically open CV2 prior to an engine off or key off event. Although the control strategies may result in additional noise, vibration, and harshness for the vehicle, this is tolerable, especially for driverless vehicles without passengers or other occupants.

While exemplary embodiments are described above, it is not intended that these embodiments describe all possible forms of the disclosure or invention. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. An autonomous vehicle comprising:
   an engine having an air intake system;
   an accessory powered by the engine;
   a compressor associated with the air intake system;
   an ejector having an inlet positioned to receive compressed air from the air intake system downstream of the compressor, and an outlet positioned to provide compressed air into the air intake system upstream of the compressor;
   a canister of an evaporative emissions system in fluid communication with a fuel tank;
   a canister purge valve fluidly coupling the canister to the air intake system;
   a first check valve positioned between and fluidly connecting the canister purge valve and the air intake system downstream of a throttle;
   a second check valve positioned between and fluidly connecting the canister purge valve and the ejector; and
   a controller configured to receive a drive cycle with a final destination, reduce a torque output of the engine below a vehicle torque demand in response to the autonomous vehicle being within a predetermined distance of the final destination, and subsequently, stimulate boosted operation of the engine by activating the accessory and increasing the torque output of the engine such that the second check valve opens.

2. The autonomous vehicle of claim 1 wherein the predetermined distance is a distance for the autonomous vehicle to reach the final destination without fueling the engine.

3. The autonomous vehicle of claim 1 wherein the controller is further configured to open the throttle without fueling the engine after the boosted operation is stimulated and until the autonomous vehicle reaches the final destination to reduce vacuum in the air intake system downstream of the throttle and maintain the second check valve in the open position.

4. The autonomous vehicle of claim 1 wherein the controller is further configured to control cam timing for the engine such that openings of intake and exhaust valves of the engine are overlapped after the boosted operation is stimulated and until the autonomous vehicle reaches the final destination to reduce vacuum in the air intake system downstream of the throttle and maintain the second check valve in the open position.

5. The autonomous vehicle of claim 1 wherein the controller is further configured to transmit a signal to another vehicle with instructions to synchronously stimulate a boosted operation of another engine of the another vehicle with the boosted operation of the engine of the autonomous vehicle.

6. The autonomous vehicle of claim 1 wherein the controller is further configured to stimulate the boosted operation in response to at least one of a temperature being above a temperature threshold, a pressure being below a pressure threshold, and a fuel level being above a fuel threshold.

7. The autonomous vehicle of claim 1 wherein the accessory is one of an alternator, an electric machine, a compressor for an air conditioning system, a light, and an electrical heater.

8. The autonomous vehicle of claim 1 wherein the controller is further configured to receive a signal from another vehicle, and stimulate the boosted operation of the engine of the autonomous vehicle in response to receiving the signal.

9. The autonomous vehicle of claim 1 wherein the second check valve is a passive valve.

10. The autonomous vehicle of claim 1 wherein the controller is further configured to receive the drive cycle with a route to the final destination, and control the autonomous vehicle to drive along the route to the final destination.

11. An autonomous vehicle comprising:
    an engine having an air intake system;
    an accessory powered by the engine;
    a compressor associated with the air intake system;
    an ejector having an inlet positioned to receive compressed air from the air intake system downstream of the compressor, and an outlet positioned to provide compressed air into the air intake system upstream of the compressor;
    a canister of an evaporative emissions system in fluid communication with a fuel tank;
    a canister purge valve fluidly coupling the canister to the air intake system;
    a first check valve positioned between and fluidly connecting the canister purge valve and the air intake system downstream of a throttle;
    a second check valve positioned between and fluidly connecting the canister purge valve and the ejector; and
    a controller configured to receive a drive cycle with scheduled boost events, and in response to a number of scheduled boost events in the drive cycle being less than a threshold, stimulate boosted operation of the engine by activating the accessory and increasing a torque output of the engine such that the second check valve opens, wherein the boosted operation of the engine is stimulated prior to a first scheduled boost event.

12. The autonomous vehicle of claim 11 wherein the controller is further configured to command the canister purge valve to an open position when the boosted operation of the engine is stimulated.

13. A method of controlling an autonomous vehicle, the method comprising:
    receiving a drive cycle with a final destination;
    reducing a torque output of an engine below a vehicle torque demand in response to the autonomous vehicle being within a predetermined distance of the final destination;
    activating an accessory powered by the engine; and
    stimulating boosted operation of the engine by increasing the torque output of the engine to meet a load of the activated accessory such that a compressor in an engine air intake system operates, wherein the compressor draws a vacuum on a check valve positioned between and fluidly coupling a canister purge valve and an ejector, wherein the compressor operation opens the check valve to remove moisture and reduce stiction in the check valve, wherein the ejector receives compressed air from the compressor and provides compressed air into the engine air intake system upstream of the compressor;

wherein boosted operation of the engine is stimulated subsequent to the torque output being reduced.

14. The method of claim 13 further comprising opening a throttle without fueling the engine after boosted operation of the engine is stimulated and until the autonomous vehicle reaches the final destination to reduce vacuum in the air intake system downstream of the throttle and maintain the check valve in the open position.

15. The method of claim 13 further comprising controlling cam timing for the engine such that openings of intake and exhaust valves of the engine are overlapped after the boosted operation of the engine is stimulated and until the autonomous vehicle reaches the final destination to reduce vacuum in the air intake system downstream of a throttle and maintain the check valve in the open position.

16. The method of claim 13 further comprising transmitting a signal to another vehicle in a platoon with instructions to synchronously stimulate a boosted operation of another engine of the another vehicle with the boosted operation of the engine.

17. The method of claim 13 further comprising receiving a signal from another vehicle in a platoon with instructions to synchronously stimulate the boosted operation of the engine of the autonomous vehicle with a boosted operation of another engine of the another vehicle.

18. The method of claim 13 further comprising receiving a drive cycle with scheduled boost events; and opening the canister purge valve while stimulating the boosted operation of the engine;

wherein the boosted operation of the engine is stimulated in response to a number of scheduled boost events in the drive cycle being less than a threshold, and prior to a first one of the scheduled boost events.

\* \* \* \* \*